United States Patent
Miki

(10) Patent No.: US 6,361,734 B1
(45) Date of Patent: Mar. 26, 2002

(54) PROCESS FOR PRODUCING POLYESTER COMPOSITION

(75) Inventor: Takatoshi Miki, Shiga-ken (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/063,355

(22) Filed: Apr. 21, 1998

(51) Int. Cl.$^7$ .............................................. B29C 47/00
(52) U.S. Cl. ................ 264/466; 264/37.32; 264/173.1; 264/210.6; 264/920
(58) Field of Search ................ 264/466, 920, 264/DIG. 65, 465, 37.32, 171.1, 173.1, 210.6, 331.18, 331.21; 525/437; 524/777, 401

(56) References Cited

U.S. PATENT DOCUMENTS

| | | | |
|---|---|---|---|
| 2,235,324 A | * 3/1941 | Moreland | 264/DIG. 65 |
| 2,353,362 A | * 7/1944 | Rudd | 264/DIG. 65 |
| 2,889,441 A | * 6/1959 | McMinn et al. | 264/DIG. 65 |
| 4,013,745 A | * 3/1977 | Brinkmann et al. | |
| 4,426,018 A | * 1/1984 | Ward | 264/920 |
| 4,487,508 A | * 12/1984 | Ratheiser | 264/DIG. 65 |
| 4,493,806 A | * 1/1985 | Hatzikelis et al. | |
| 4,732,799 A | * 3/1988 | Sakamoto et al. | |
| 5,023,291 A | * 6/1991 | Sakamoto et al. | |
| 5,225,130 A | * 7/1993 | Deiringer | |
| 5,254,288 A | * 10/1993 | Verheijen et al. | |
| 5,308,562 A | * 5/1994 | Wohlfahrt-Laymann | 264/920 |
| 5,470,637 A | * 11/1995 | Sakamoto et al. | |
| 5,807,517 A | * 9/1998 | Wissmann et al. | 264/DIG. 65 |
| 5,833,905 A | * 11/1998 | Miki | |
| 5,852,164 A | * 12/1998 | Akai et al. | |
| 5,876,644 A | * 3/1999 | Nichols et al. | |

| | | |
|---|---|---|
| 6,217,804 B1 | * 4/2001 | Lieberman |

FOREIGN PATENT DOCUMENTS

| | | |
|---|---|---|
| DE | 41 18 858 | 12/1992 |
| EP | 0 295 654 | 12/1988 |

OTHER PUBLICATIONS

Masaji, "Production of Polyester Film", Patent Abstracts of Japan, vol. 007, No. 028 (C–149), Feb. 4, 1983; Japanese Patent No. 57 185345, (Nov. 15, 1982).

Tetsuo, "Method of Forming Polyester Film", Patent Abstracts of Japan, vol. 008, No. 016, (M–270), Jan. 24, 1984, Japanese Patent No. 58 177316, (Oct. 18, 1983).

Yukizou, "Method Of Casting Polyethylene Terephthalate", Patent Abstracts of Japan, vol. 011, No. 385, (M–651), Dec. 16, 1987, Japanese Patent No. 62 152715, (Jul. 1, 1987).

Database WPI, Section Ch, Week 8506, "Polyethylene Terephthalate Based Film Produce Metal Salt Aliphatic Mono Di Carboxylic Acid Add Resin Melt", Class A23, AN 85–035014, (Dec. 22, 1984).

Osamu, "Manufacture Of Polyester Film", Patent Abstracts of Japan, vol. 012, No. 036, (M–664), Feb. 3, 1988, Japanese Patent No. 62 189133, (Aug. 18, 1987).

* cited by examiner

Primary Examiner—Mark Eashoo
(74) Attorney, Agent, or Firm—Foley & Lardner

(57) ABSTRACT

A process for producing a polyester composition, comprising polyester and a metal salt of an aliphatic carboxylic acid, whereby a metal salt and polyester are fed together into a vented extruder as a raw material. The raw material has a specific resistance of not less than $1 \times 10^7$ Ω·cm upon melting and a metal atom concentration of 0.5 to 1,000 ppm based on the polyester composition. This process is industrially useful for producing a polyester composition which can be used to form sheets using an electrostatic pining method.

14 Claims, 4 Drawing Sheets

PROCESS FOR PRODUCING POLYESTER COMPOSITION

BACKGROUND OF THE INVENTION

The present invention relates to a process for producing a polyester composition, and more particularly, to an industrially useful process for producing a polyester composition to which an electrostatic pinning method usually adopted for molding amorphous sheets can be suitably applied.

Polyester films, typically polyethylene terephthalate films have been used in various application fields as base materials for, e.g., information recording media, capacitor films, wrapping films, films for printing plates, electrical insulating films, photographic films or the like, because of their excellent mechanical properties, electrical properties, chemical resistance or dimensional stability.

In general, polyester has been melt-extruded, quenched and solidified to form an amorphous sheet. Further, the amorphous sheet has been subjected to an orientation process to form a stretched film. In the production of such polyester films, edge portions of extruded polyester sheets have a larger thickness than that of the remaining portion thereof due to so-called neck-in phenomenon, and the edge portions having a larger thickness is used as a clamping clearance for clips. Therefore, the edge portions of the polyester films are cut or trimmed off as edge films. The edge films are pulverized, melt-extruded into pellets for reuse thereof.

The above-mentioned amorphous sheets have been generally formed by an electrostatic pinning method. The electrostatic pinning method comprises extruding a molten sheet over a rotary cooling drum and electrostatically charging the molten sheet by applying a D.C. voltage of about 5 to about 10 kV to an electrode arranged above the upper surface of the molten sheet perpendicularly to the delivery direction of the molten sheet, thereby enhancing the adhesion between the molten sheet and the rotary cooling drum (Japanese Patent Publication (KOKOKU) No. 37-6124(1962)).

In such an electrostatic pinning method, when the rotation speed of the rotary cooling drum is increased in order to improve the productivity, the adhesion force between the molten sheet and the rotary cooling drum is decreased, so that so-called constrained air bubbles of a crater shape are formed on the surface of the obtained sheet. The constrained air bubbles are likely to be formed as the specific resistance of raw polyester upon melting becomes increased. In order to reduce the specific resistance, there have been proposed various methods for incorporating a metal compound into the raw polyester.

As an example of these methods, in Japanese Patent Application Laid-open (KOKAI) No. 57-18534(1982), there have been proposed a method of adding a metal compound to polyester after the polymerization thereof. In this method, a metal salt of aliphatic monocarboxylic acid or dicarboxylic acid is added in an amount of 0.01 to 1% by weight based on the weight of polyester. In addition, from the standpoints of uniform blending and workability of the metal salt, a master batch containing a high concentration of the metal salt is produced and then mixed with polyester. However, in such a master batch process, when the raw polyester is melt-extruded into chips, there arises a problem that the molecular weight of polyester is inevitably decreased due to the high concentration of the metal salt.

In order to eliminate the above-mentioned problem, in Japanese Patent Publication (KOKOKU) No. 4-64328 (1992), there has been proposed a method of controlling a melting temperature of the metal salt-added polyester to a specific range. However, there is a disadvantage that this method is applicable only to polyesters having a low melting point such as isophthalic acid copolyesters or polybutylene terephthalate, and not applicable to other polyesters.

SUMMARY OF THE INVENTION

It is an object of the present invention to provide a process for producing a polyester composition to which an electrostatic pinning method usually adopted for the shaping of amorphous sheets can be suitably applied, by adding a specific amount of a metal salt to polyester with a high accuracy.

It is another object of the present invention to provide an industrially useful process for producing a polyester composition to which an electrostatic pinning method usually adopted for forming amorphous sheets, can be suitably applied, especially by using recovered or reclaimed polyester as a raw material.

As a result of the present inventors' various studies for accomplishing the aims, it has been found that:

(1) by using a specific vented extruder as described in Japanese Patent Application Laid-open (KOKAI) No. 6-91635(1994) which have been used only in limited cases where a slurry containing particles (mixture of solid and liquid) is mixed with polyester, and by limiting an amount of the metal salt added to polyester to a predetermined range, the conventional problems such as decrease in molecular weight of polyester due to the metal salt can be avoided, thereby readily accomplishing the above-mentioned objects;

(2) by using the vented extruder and feeding the polyester and the metal salt into the vented extruder through a common feed opening, it is possible to add the metal salt in an accurate amount;

(3) by using a regenerating apparatus comprising a pulverizer and an extruder both connected with each other, and by limiting an amount of the metal salt added to recovered or reclaimed polyester to a specific range, the problems such as decrease in molecular weight of the polyester due to the metal salt can be solved; and (4) as the extruder used in the regenerating apparatus, there can be suitably used those having a vent port and a powder feed port.

The present invention has been attained on the basis of the finding.

In a first aspect of the present invention, there is provided a process for producing a polyester composition comprising polyester and a metal salt of aliphatic carboxylic acid, which process comprises providing a vented extruder; and feeding the metal salt together with polyester as a raw material having a specific resistance of not less than $1 \times 10^7$ $\Omega \cdot$cm upon melting, to a vented extruder, in such an amount that the concentration of metal atom based on the polyester composition is 0.5 to 1,000 ppm.

In a second aspect of the present invention, there is provided a process for producing a polyester composition comprising polyester and a metal salt of aliphatic carboxylic acid, which process comprises providing a regenerating apparatus comprising a pulverizer and a single screw extruder connected to the pulverizer; feeding recovered polyester having a specific resistance of not less than $1 \times 10^7 \Omega \cdot$cm upon melting, to the pulverizer; pulverizing the recovered polyester in the pulverizer; and adding the metal salt to the pulverized recovered polyester in such an amount that the concentration of metal atom based on the polyester composition is 0.5 to 1,000 ppm, before the pulverized recovered polyester reaches the single screw extruder.

In a third aspect of the present invention, there is provided a process for producing a polyester composition comprising polyester and a metal salt of aliphatic carboxylic acid, which process comprises providing a regenerating apparatus comprising a pulverizer and a single screw extruder connected to the pulverizer, the single screw extruder having a vent port and a powder feed port arranged sequentially along the extruding direction thereof; feeding recovered polyester having a specific resistance of not less than $1 \times 10^7$ Ω·cm upon melting, to the pulverizer; pulverizing the recovered polyester in the pulverizer; and feeding the metal salt through the powder feed port into the single screw extruder to add the metal salt to the pulverized recovered polyester in such an amount that the concentration of metal atom based on the polyester composition is 0.5 to 1,000 ppm.

DETAILED DESCRIPTION OF THE INVENTION

Figure 1:
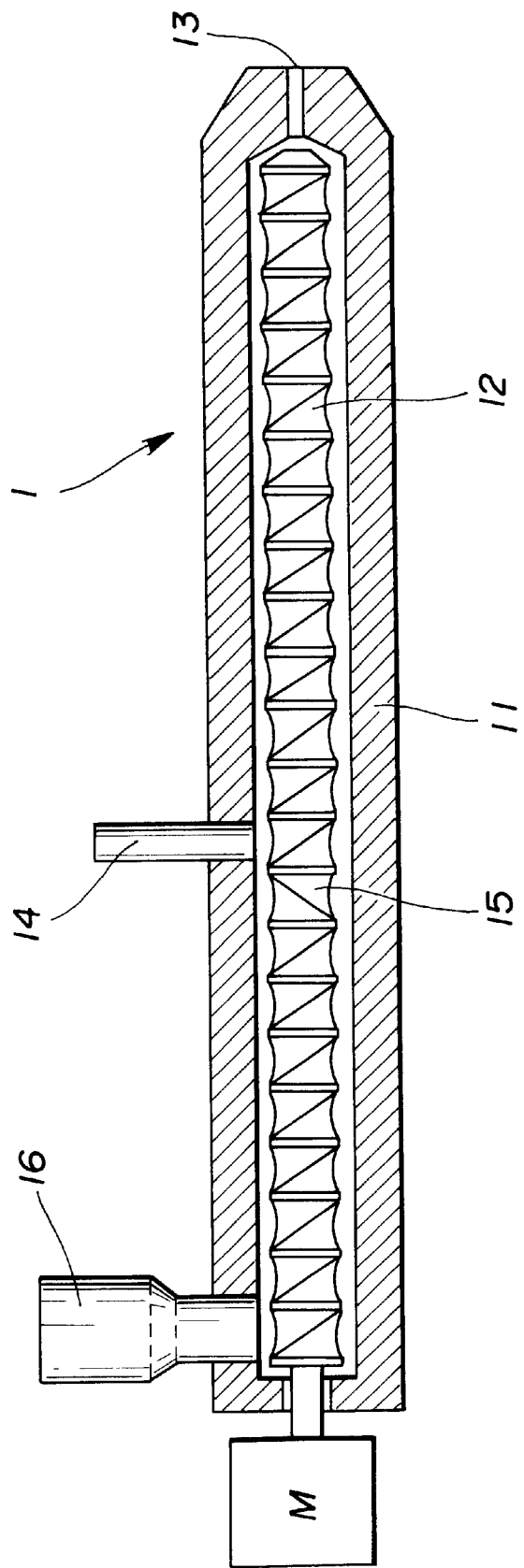
FIG. 1 is a schematic side view of a vented twin screw extruder suitably used in the first embodiment of the present invention, in which reference numeral 1 denotes the vented twin screw extruder; 11 denotes a heating cylinder; 12 denotes screws; 13 denotes an extruder orifice; 14 denotes a vent port; 15 denotes an inverse screw; 16 denotes a feed opening for raw materials; and M denotes a screw driving unit.

The present invention will be described in detail below.

The polyesters (including recovered or reclaimed polyesters) used in the present invention, may include those formed of an aromatic dicarboxylic acid component and a glycol component. Especially suitable polyesters may have repeating units containing ethylene phthalate units, ethylene-2,6-naphthalate units or 1,4-cyclohexylene dimethylene terephthalate units in an amount of not less than 80%. Incidentally, the polyesters used in the present invention may contain a third component copolymerized therewith.

As the aromatic dicarboxylic acid components, there may be exemplified terephthalic acid, 2,6-naphthalene dicarboxylic acid, isophthalic acid, phthalic acid, adipic acid, sebacic acid, 4,4'-diphenyl dicarboxylic acid, oxycarboxylic acid (e.g., p-oxy-ethoxy benzoic acid) or the like.

Whereas, as the glycol components, there may be exemplified ethylene glycol, 1,4-cyclohexane dimethanol, diethylene glycol, triethylene glycol, propylene glycol, butane diol, neopentyl glycol or the like. In the present invention, polyesters having repeating units containing ethylene phthalate units or ethylene-2,6-napthalate units in an amount of not less than 80%, are more preferably used.

The polyesters used in the present invention, are not required to reduce the specific resistance by adding the metal salt thereto upon the polymerization. The specific resistance of the polyesters used in the present invention upon melting, is usually not less than $1 \times 10^7$ Ω·cm, preferably not less than $3 \times 10^7$ Ω·cm, more preferably not less than $5 \times 10^7$ Ω·cm. The electrostatic pinning property of the polyester becomes deteriorated, as the specific resistance of the polyester is increased. However, in the present invention, it is possible to decrease the specific resistance of the polyester while inhibiting reduction in molecular weight thereof. Therefore, the polyester having a higher specific resistance upon melting, may be used. The polyesters used in the present invention may contain inorganic and/or organic particles as known in the arts, and may further contain fine particles resulting from catalyst residues generated upon the polymerization.

The polyesters used in the present invention may be in the from of a dry product. However, the use of such dry polyesters is not essential to the present process. In view of advantages of omission of drying process and preceding crystallization process, undried polyester is preferably used. Further, the polyester used in the present invention may be in the form of a mixture of different two or more kinds of polyesters.

As the metal salts of aliphatic carboxylic acid used in the present invention, there may be exemplified magnesium salts, lithium salts, sodium salts, potassium salts, manganese salts, zinc salts, calcium salts or aluminum salts of aliphatic monocarboxlic or dicarboxylic acid having about 4 to about 30 carbon atoms. Among these metal salts, magnesium salts, manganese salts, zinc salts or calcium salts are preferred. Especially, the magnesium salts are more preferred because the salts can exhibit an excellent thermal stability against the molten polyester and have less possibility to form fish eyes.

Specific examples of the above-mentioned metal salts of aliphatic carboxylic acid, may include magnesium decanedicarboxylate, magnesium palmitate, manganese palmitate, zinc palmitate, magnesium stearate, zinc stearate, potassium oleate, sodium oleate, magnesium oleate, zinc oleate, magnesium sebacate, manganese sebacate or the like.

As the metal salts of aliphatic monocarboxylic acids suitably used in the present invention, magnesium salts are exemplified. For example, there may be suitably used magnesium salts of aliphatic monocarboxylic acids having about 4 to about 30 carbon atoms. Specific examples of such magnesium salts may include magnesium palmitate, magnesium stearate, magnesium oleate, magnesium sebacate or the like. Among them, magnesium stearate can be used in extensive applications such as food packaging, cosmetics packaging or medicine packaging because of inexpensive and safe compound. In addition, magnesium decanedicarboxylate is preferably used because the magnesium salt has a melting point as high as 275° C. and a good heat resistance, and can maintain a high degree of polymerization of polyester.

The above-mentioned metal salts of aliphatic carboxylic acids (hereinafter referred to merely as "metal salts") are in the form of powder, generally have a melting point lower than those of polyesters and are readily melted when supplied into the below-mentioned vented extruder.

First, the first preferred embodiment of the present invention will be described below by referring to FIG. 1. The feature of the first embodiment of the present invention, lies in that by using a vented extruder and further by using a polyester having a specific resistance of not less than $1\times10^7$ $\Omega\cdot cm$ upon melting as a raw material, a metal salt is supplied together with the polyester into a vented extruder in such an amount that the concentration of the metal atom in the polyester is in the range of 0.5 to 1,000 ppm. In a more specified form of the first embodiment, the metal salt and at least a part of the above-mentioned polyester are independently supplied into the vented extruder through a common feed opening for raw materials.

As the vented extruder used in the first embodiment of the present invention, vented twin screw extruders as shown in FIG. 1 (hereinafter referred to merely as "twin screw extruder") are preferred, and twin screw extruders whose twin screws are rotated in the same direction, are more preferred. In the case of twin screw extruders whose twin screws are rotated in opposite directions, it is difficult to reduce a pressure of the vented portion, so that there may arise a disadvantage that the specific viscosity of polyester therein is considerably decreased. The ratio of a cylinder length (L) to a cylinder inner diameter (D) of the twin screw extruder is usually 20 to 60/1, preferably 22 to 50/1. When the ratio L/D is less than 20/1, there is a tendency that melting of polyester and deaeration thereof by venting become unsatisfactory. On the other hand, when the ratio L/D is more than 60/1, the residence time of the polyester in the twin screw extruder is considerably increased, so that the temperature of the polyester is inevitably raised and the degree of polymerization of the polyester tends to be decreased.

The method of supplying the polyester and the metal salt into the twin screw extruder 1 is not particularly restricted. For example, the metal salt in the form of powder may be supplied through a powder feed port formed at a downstream (slipstream) position of an inverse screw 15 described hereinafter, by ordinary methods. The polyester may also be supplied through a similar feed port into the twin screw extruder.

Figure 3:
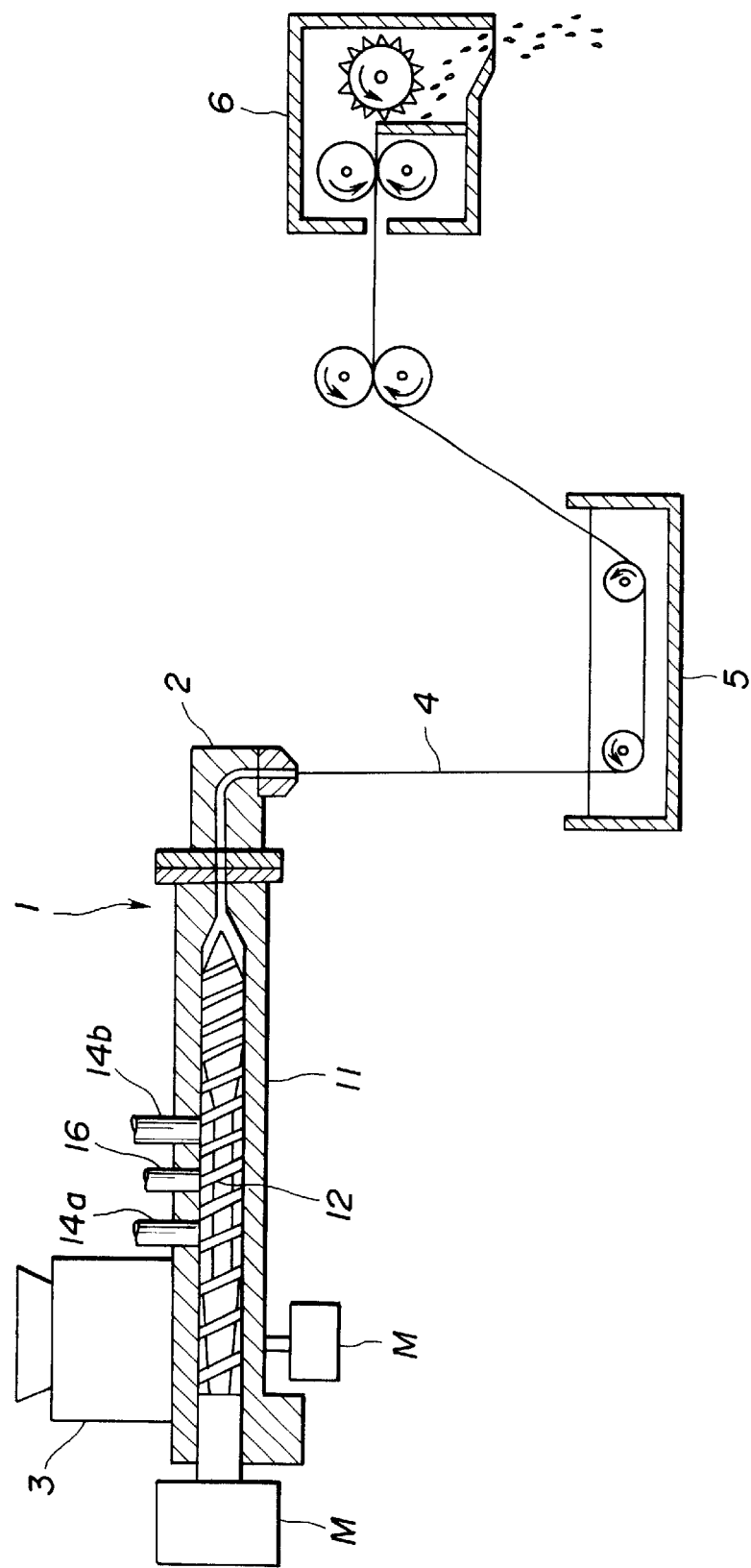
FIG. 3 a schematic side view of a regenerating apparatus comprising a pulverizer and a vented single screw extruder connected to the pulverizer, and suitably used in the third preferred embodiment of the present invention, in which reference numeral 16 denotes a powder feed port; and the same reference numerals as shown in FIG. 2 denote the same parts.

Incidentally, the powder feed port is not shown in FIG. 1 illustrating the twin screw extruder, but the feed port is designated by reference numeral 16 in FIG. 3 illustrating a vented single screw extruder. The downstream (slipstream) position of the inverse screw 15 is generally called "transportation zone" kept under a relatively low pressure.

In the first embodiment of the present invention, it is preferred that the polyester and the metal salt be supplied into the twin screw extruder through a feed opening 16 for raw materials provided at a base portion of the twin screw extruder. The feed opening 16 for raw materials is of such a type opened to atmosphere, so that it is possible to supply these raw materials under ordinary pressure.

In addition, the metal salt may be added in the form of a mixture prepared by preliminarily mixing the metal salt with the polyester.

In the first embodiment of the present invention, it is preferred that the polyester and the metal salt are independently charged from separate feeders through the common feed opening 16 into the twin screw extruder. Meanwhile, polyesters have a wide range of different bulk densities depending upon their properties. For this reason, in the first embodiment, it is preferred that polyester having a relatively small bulk density, specifically a bulk density of not more than 0.6 g/cm³, be selectively used as the polyester introduced through the feed opening 16. In the case where such a low-bulk density polyester is used, the volume occupied by the polyester within the feed opening conduit is increased as compared to that occupied by other polyesters having the same weight but a larger bulk density, so that the polyester falls while contacting with an inner surface of the feed opening conduit, resulting in such an advantage that if the metal salt is eventually attached to the inner surface of the feed opening conduit, the falling polyester can scrape off the attached metal salt.

The above-mentioned low-bulk density polyester may be produced, for example, by pulverizing polyester sheets or the like. Especially, there may be suitably used low-bulk density polyesters prepared by cutting or trimming off edge portions of polyester sheet quenched over a rotary cooling drum and then pulverizing the trimmed-off edge portions, or prepared by cutting or trimming off edge portions of a stretched polyester sheet obtained by further subjecting the polyester sheet to biaxial stretching process, and then pulverizing the trimmed-off edge portions. The low-density polyesters may contain inorganic and/or organic particles or fine particles resulting from catalyst residues generated upon the polymerization, and may be of any suitable shape such as pellet-like or fluff-like shape. The amount of the low-bulk density polyester based on the total weight of polyester supplied is not particularly restricted as long as the metal salt can be stably supplied into the heating cylinder 11.

As the above-mentioned feeders for polyester, there may be used belt-type feeders, loss-in-weight-type feeders or the like. Preferably, these feeders have a weight control mechanism in order to assure the supply of a constant amount of polyester even when the bulk density of polyester supplied is fluctuated. In the case where the shape and bulk density of polyester supplied are kept constant, a volumetric feeder (constant-volume feeder) may be used.

Whereas, as the above-mentioned feeders for the metal salts, there may also be used belt-type feeders, loss-in-weight-type feeders or the like. These feeders may have a weight control mechanism similarly to those for polyester. If the amount of the metal salt discharged can be kept stable, there may also be used the volumetric feeder.

A part of water contained in the polyester and the metal salt occasionally tends to be vaporized within the twin screw extruder 1 and to flow in reverse direction toward the feed opening 16 and further into delivery conduits connecting the feed opening to the respective feeders for the polyester and the metal salt, where the water vapor is condensed and attached to an inner surface thereof. More specifically, since upper portions of the delivery conduits have a lower temperature than that of the feed opening 16, there is a tendency that the condensed water adheres to inner surfaces of the upper portions of the delivery conduits. Accordingly, the respective feeders for the polyester and the metal salt are preferably disposed in the vicinity of the feed opening 16.

In the present invention, the metal salt may be supplied by gravity from the feeders therefor disposed above the feeding opening 16 at a height usually not more than 30 times, preferably not more than 20 times, more preferably not more than 15 times the cylinder inner diameter D.

In the case where the temperature of the feed opening 16 is higher than a melting point of the metal salt, the molten metal salt tends to adhere to the feed opening 16 and peripheries thereof, so that it is difficult to assure stable supply of the metal salt. For this reason, the feed opening 16 is usually maintained at a temperature less than the melting point of the metal salt.

In the first embodiment of the present invention, since at least a part of polyester and the metal salt are independently supplied through the common feed opening 16, there can be obtained such an effect that the metal salt attached to the inner surface of the feed opening conduit is scraped off by polyester supplied therethrough, as described above. Further, since the temperature of polyester supplied is generally lower than that of the cylinder, it is possible to maintain the feed opening 16 at a low temperature by the mass flow of polyester, thereby preventing the metal salt from being attached to the inner surface of the feed opening conduit. Furthermore, the metal salt deposited on surfaces of screws can also be scraped off by polyester supplied, and the scraped-off metal salt is attached to the surface of polyester and stably transported in the form of a solid together with the polyester, so that problems such as deposition of the metal salt over the screws or too long residence of the metal salt in the cylinder can be avoided. Accordingly, in accordance with the present invention, the metal salt can be supplied and mixed with polyester with a high accuracy.

The amount of the metal salt supplied into the twin screw extruder 1 is in the range of 0.5 to 1,000 ppm (calculated as concentration of metal atom in polyester composition). The amount of the metal salt supplied is preferably 10 to 800 ppm, more preferably 15 to 500 ppm (calculated as concentration of metal atom in polyester. composition). When the amount of the metal salt supplied is less than 0.5 ppm (calculated as concentration of metal atom in polyester composition), the specific resistance of polyester upon melting cannot be sufficiently reduced, so that polyester sheets obtained by an electrostatic pinning method disadvantageously contain a large amount of constrained air bubbles. On the other hand, when the amount of the metal salt supplied is more than 1,000 ppm, polyester is hydrolyzed by the action of the metal salt, thereby causing the decrease in intrinsic viscosity (IV) thereof.

More specifically, in the first embodiment of the present invention, the surface of polyester is successively renewed by kneading operation and removal of water by means of deaeration in the extruder, so that the metal salt can be prevented from staying locally, thereby suppressing the decomposition of polyester. However, when the amount of the metal salt supplied is more than 1,000 ppm, it is not possible to exhibit a sufficient effect of suppressing the decomposition of polyester by the above-mentioned mechanism.

The polyester and the metal salt supplied through the feed opening 16 into the heating cylinder 11 are transported by the screws 12 toward an extruder orifice 13. When the obtained mixture reaches a region of a vent port 14 via the inverse screw section 15, the surface of polyester undergoes diffusive deaeration (hereinafter referred to merely as "deaeration"), so that water is removed from polyester. In order to effectively conduct such a deaeration, the region of the vent port 14 may be kept under reduced pressure, specifically at a pressure of usually not more than 40 kPa, preferably not more than 30 kPa, more preferably not more than 20 kPa.

When polyester is melted, the polyester is immediately hydrolyzed by the action of water, so that there arise a problem that the intrinsic viscosity (hereinafter referred to merely as "IV") of polyester is decreased. For this reason, it is preferred that the polyester is deaerated under reduced pressure immediately after the melting of polyester is initiated. Accordingly, the vent port 14 is disposed at a position spaced by usually not more than 40 times (40D), preferably not more than 30 times (30D), more preferably not more than 25 times (25D), most preferably not more than 15 times (15D) the cylinder inner diameter D, apart from the feed opening 16.

The opening area of the vent port 14 is not particularly restricted as long as the molten polyester can be prevented from overflowing the heating cylinder 2. However, a larger opening area of the vent port 14 is preferred because the deaeration from the surface of polyester can be promoted thereby. The direction of opening of the vent port 14 is not particularly restricted, but the vent port 14 may be opened in either upward or lateral direction.

Meanwhile, when the rotating speed of screws of a twin screw extruder is increased while keeping an extrusion output constant, the surface of polyester existing on the surfaces of the screws can be forcibly renewed, so that the efficiency of deaeration from the molten polyester is correspondingly increased. That is, it is considered that the deaeration efficiency can be improved as the rotating speed of screws is increased while keeping the extrusion output from the twin-screw extruder constant. However, as a result of the present inventors' studies, it has been found that the deterioration in retention of IV is caused after temporary improvement or retention of IV when the rotating speed of screws is increased while keeping the extrusion output constant.

The above mentioned phenomenon of the deterioration in retention of IV is caused due to the fact that the resin undergoes promoted thermal degradation resulting from the increase in resin temperature. Accordingly, in the present invention, it is preferred that the amount of polyester extruded (extrusion output) and the rotating speed of the screws be appropriately selected to assure the retention of IV.

More specifically, in the first embodiment of the present invention, the melt-extrusion is conducted so as to satisfy the requirement represented by the following formula (I), preferably the following formula (II), more preferably the following formula (III):

$$5.2 \times 10^{-6} \times D^{2.8} \leq Q/N \leq 15.8 \times 10^{-6} \times D^{2.8} \qquad (I)$$

$$6.0 \times 10^{-6} \times D^{2.8} \leq Q/N \leq 15.0 \times 10^{-6} \times D^{2.8} \qquad (II)$$

$$6.3 \times 10^{-6} \times D^{2.8} \leq Q/N \leq 14.7 \times 10^{-6} \times D^{2.8} \qquad (III)$$

wherein D represents a cylinder inner diameter (mm) of the twin screw extruder; Q represents an extrusion output per unit time (kg/hr); and N represents a rotating speed (rpm) of screws.

When the ratio Q/N is less than $5.2 \times 10^{-6} \times D^{2.8}/1$ ($5.2 \times 10^{-6} \times D^{2.8} > Q/N$), the rotating speed of the screws relative to the amount of polyester extruded becomes too high, so that an excessive amount of heat is generated by shearing action of the screws, thereby deteriorating the retention of IV. On the other hand, when the ratio Q/N is more than $15.8 \times 10^{-6} \times D^{2.8}/1$ ($Q/N > 15.8 \times 10^{-6} \times D^{2.8}$), the rotating speed of the screws relative to the amount of polyester extruded becomes too low, so that the surface of the molten resin cannot be satisfactorily renewed under vacuum and the deaeration thereof cannot be sufficiently conducted, thereby also deteriorating the retention of IV.

In the first embodiment of the present invention, the polyester melted in the twin screw extruder is melt-extruded from the extruder orifice 13 through a slot die, into strands or sheets. The strands or sheets extruded may be introduced into a water-cooling tank to be cooled and solidified, and cut into pellets by a strand cutter. Alternatively, the molten polyester may be extruded over a rotary cooling drum into a sheet, and the extruded sheet is attached and retained onto the surface of the rotary cooling drum by an electrostatic pinning method to form a substantially amorphous sheet. In this case, in order to improve uniformity in sheet thickness along a longitudinal direction of the sheet (along the rotating direction of the rotary cooling drum), a metering pump (so-called gear pump) may be disposed between the twin screw extruder and the slot die to enable the molten polyester to be introduced into the slot die at a uniform flow rate. The amorphous sheet may be further stretched to form a stretched film. Incidentally, in FIG. 1, the slot die, the water-cooling tank, the strand cutter, the rotary cooling drum and their peripheral facilities are omitted.

Next, the second preferred embodiment of the present invention will be described with reference to FIG. 2. The feature of the second embodiment of the present invention lies in that by using a regenerating apparatus comprising a pulverizer and a single screw extruder both connected with each other, recovered polyester having a specific resistance of not less than $1 \times 10^7$ $\Omega \cdot cm$ upon melting is charged into the pulverizer and pulverized therein, and a metal salt is added to the pulverized recovered polyester in an amount of 0.5 to 1,000 ppm calculated as the concentration of metal atom in the polyester composition, before the polyester reaches the single screw extruder.

Figure 2:
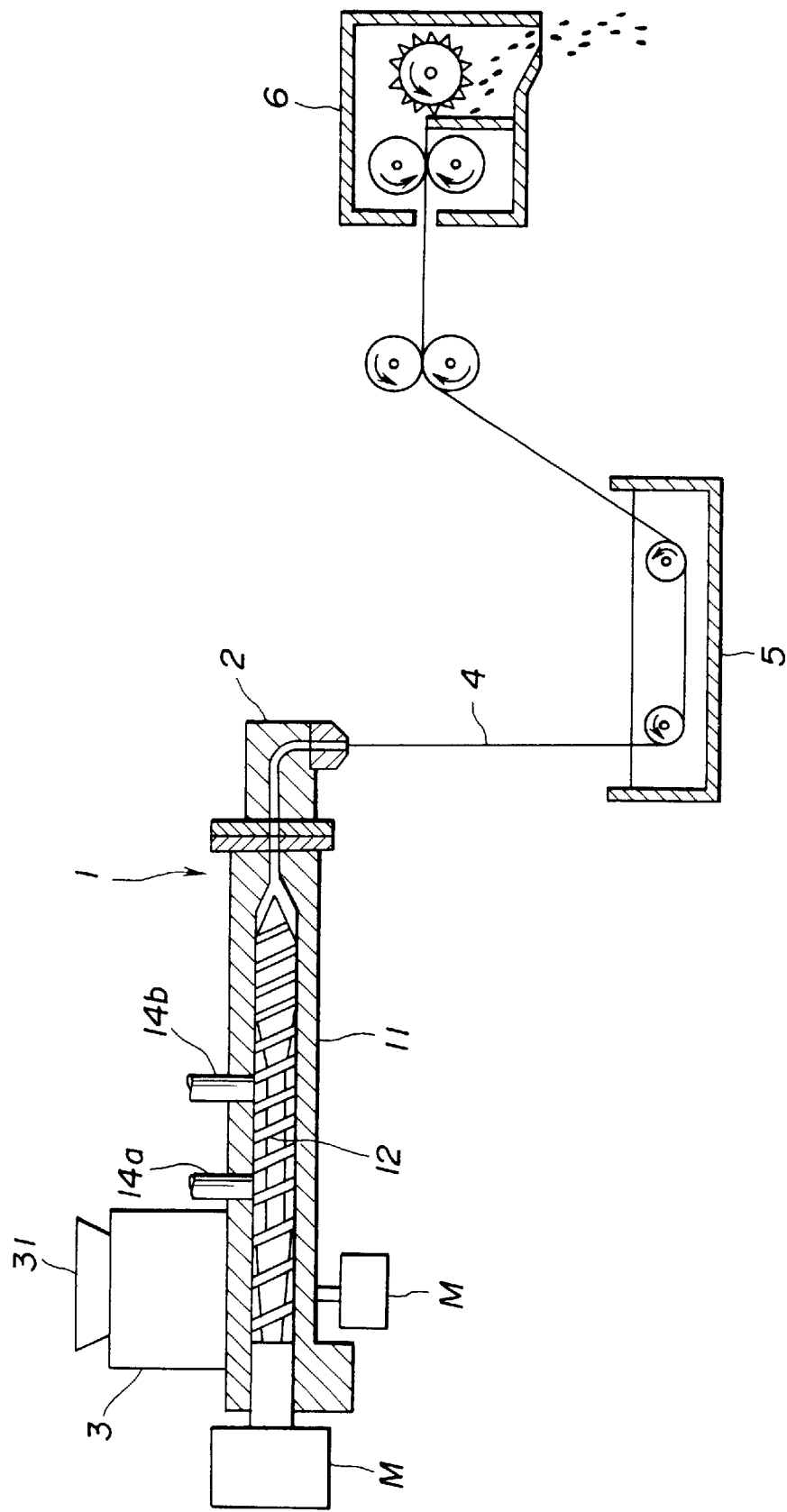
FIG. 2 is a schematic side view of a regenerating apparatus comprising a pulverizer and a vented single screw extruder connected to the pulverizer, and suitably used in the second embodiment of the present invention, in which reference numeral 1 denotes the vented single screw extruder; 11 denotes a heating cylinder; 12 denotes a screw; 3 denotes a pulverizer; 31 denotes a feed opening for raw materials; 2 denotes a strand die; 4 denotes a strand; 5 denotes a strand bath; 6 denotes a pelletizer; 14a denotes a first vent port; 14b denotes a second vent port; D denotes a disc with cutting blades; and M denotes a driving unit.

As the extruder used in the second preferred embodiment of the present invention, vented single screw extruders as shown in FIG. 2 (hereinafter referred to merely as "single screw extruder") are preferred. The ratio (L/D) of a cylinder length L to a cylinder inner diameter D of the single screw extruder, is usually 18 to 60/1, preferably 20 to 50/1. When the ratio L/D is less than 18/1, the melting of polyester and the deaeration by venting tends to be unsatisfactory. On the other hand, when the ratio L/D is more than 60/1, the residence time of polyester in the single screw extruder is considerably increased, so that the temperature rise of polyester cannot be avoided and the degree of polymerization of polyester tends to be decreased.

The recovered polyester (hereinafter referred to merely as "polyester") used in the second embodiment of the present invention, may be in the form of films and/or amorphous pellets.

Figure 4:
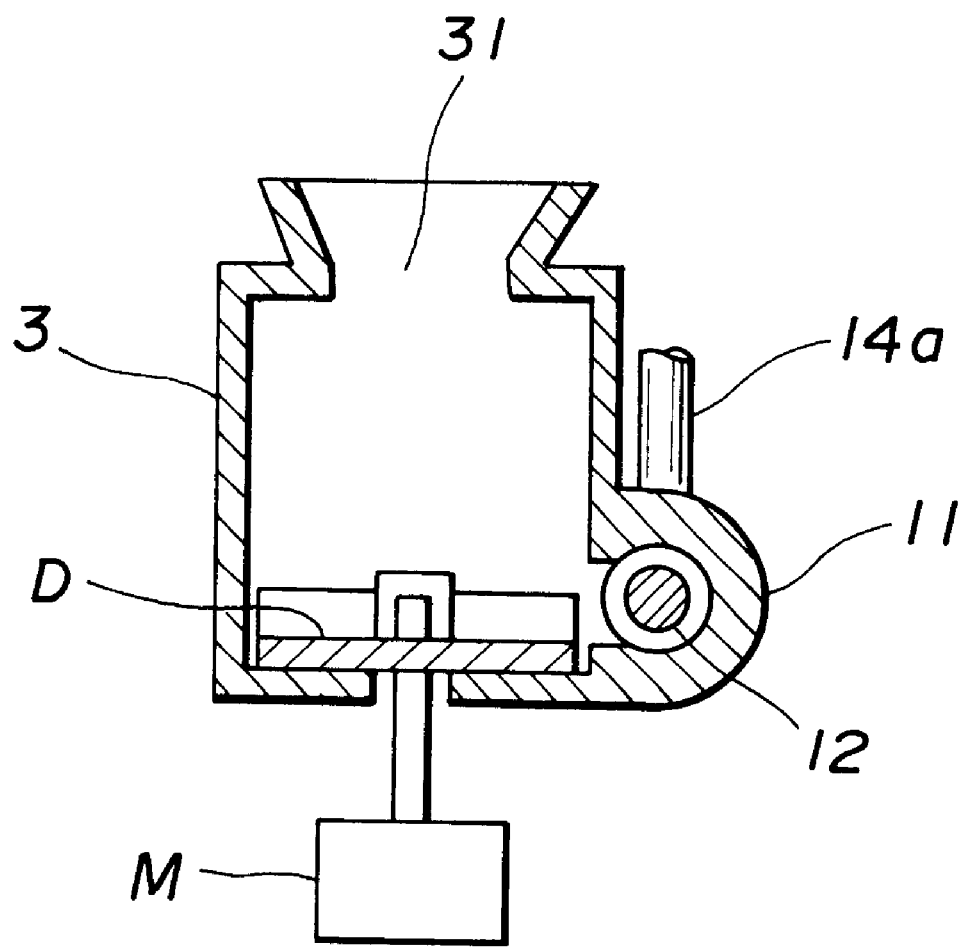
FIG. 4 is an explanatory sectional view of the pulverizer as shown in FIGS. 2 and 3.

In the second embodiment of the present invention, as the pulverizer 3 for pulverizing polyester, there may be used a cylinder-shaped pulverizer as shown in FIG. 4, which is provided at a bottom thereof with a disc D with cutting blades. The rotating speed of the above-mentioned disc D may be varied depending upon the size of the pulverizer 3 used, and usually not more than 2,000 ppm, preferably not more than 1,800 ppm (calculated as concentration of metal atom in polyester composition). Upon pulverizing, the temperature of polyester in the pulverizer 3 is raised due to frictional heat generated by the contact between polyester and the cutting blades, and between polyester and side walls of the pulverizer. In order to remove water contained in polyester as much as possible, the temperature of polyester in the pulverizer 3 is maintained at usually not less than 90° C., preferably not less than 100° C., more preferably 105° C. Incidentally, the pulverizer 3 may be of any type.

The metal salt may be added to the pulverized recovered polyester at any stage before the polyester reaches the single screw extruder 1 by using the above-mentioned weigh feeder or volumetric feeder for raw materials. Specifically, the metal salt may be supplied, for example, through a feed opening 31 for raw materials provided at an upper portion of the pulverizer 3 as shown in FIG. 2, so that water contained in the metal salt can be effectively removed by the above-mentioned frictional heat. The amount of the metal salt supplied may be identical to that used in the first embodiment of the present invention.

Similarly, polyester may be supplied through the feed opening 31 of the pulverizer 3, and mixed with the metal salt while being pulverized by the disc D with cutting blades provided at the bottom of the pulverizer 3. The obtained mixture is then fed into the extruder 1 connected to the pulverizer 3. Incidentally, polyester may be preliminarily mixed with a predetermined amount of the metal salt to form a mixture and supply the obtained mixture to the pulverizer 3. It is preferred that the amount of polyester supplied through the feed opening 31 be controlled such that the disc D having cutting blades and disposed at the bottom of the pulverizer 3 can retain a constant rotating force.

The mixture of polyester and the metal salt supplied to the single screw extruder 1 is transported by the rotation of screw 12 in the heating cylinder 11 through regions of first and second vent ports 14a and 14b toward a strand die 2. In the regions of the first and second vent ports 14a and 14b, the mixture undergoes diffusive deaeration (hereinafter referred to merely as "deaeration") to remove residual water from the surface of polyester. In order to effectively conduct such a deaeration, the region of the first vent port 14a is maintained under the same reduced pressure as used in the first embodiment of the present invention. In addition, in order to inhibit the decrease of IV of polyester, the first vent port 14a is located at a similar position to that described in the first embodiment.

Incidentally, the second vent port 14b may be optionally arranged. The second vent port 14b is useful to inhibit the decrease in molecular weight of the polyester composition and remove bubbles contained in the polyester composition. The region of the second vent port 14b may be maintained under the same reduced pressure as that at the region of the first vent port 14a.

In the apparatus shown in FIG. 2, a mesh filter, a sintered metal filter, etc., may be fitted between the single screw extruder 1 and the strand die 2 in order to remove impurities or foreign materials contained in the polyester. In the case where the pressure loss upon filtering is large and causes a considerable decrease in extrusion output, a booster pump such as gear pump may be fitted between the single screw extruder 1 and the above-mentioned filter.

A strand 4 melt-extruded from the strand die 2, is passed through a strand bath 5 so as to be cooled and solidified, and thereafter pelletized by a pelletizer 6.

Next, the third preferred embodiment of the present invention will be described by referring to FIG. 3. The feature of the third preferred embodiment of the present invention lies in that by using a regenerating apparatus comprising a pulverizer and a single screw extruder connected to the pulverizer and having a vent port and a powder feed port sequentially arranged along its extruding direction, recovered polyester having a specific resistance of not less than $1 \times 10^7$ $\Omega \cdot cm$ upon melting is fed into the pulverizer and pulverized therein, and a metal salt is fed through the powder feed port in an amount of 0.5 to 1,000 ppm calculated as the concentration of metal atom in the polyester composition. In a further specified form of the third preferred embodiment, the recovered polyester is fed into the pulverizer and pulverized therein, and the metal salt and polyester having a bulk density of 0.05 to 1.0 g/cm³ are fed through the powder feed port.

As the extruder used in the third preferred embodiment, a vented single screw extruder as shown in FIG. 3 (hereinafter referred to merely as "single screw extruder") is preferred.

The single screw extruder shown in FIG. 3 differs from that shown in FIG. 2 in such a constitution that a powder feed port 16 is provided on a downstream (slipstream) side of a first vent port 14a, more specifically between the first vent port 14a and the second vent port 14b. Accordingly, the conditions described in the second embodiment can be applied to the third preferred embodiment except for those for the powder feed port 16.

The powder feed port 16 as shown in FIG. 3 may be opened to atmosphere, or may be sealed, for example, with an inert gas, nitrogen gas, etc., to inhibit oxidative deterioration, inclusion of impurities, moisture absorption or the like. The opening area and shape of the powder feed port 16 are not particularly restricted as long as a constant supply of the metal salt can be assured. Also, the powder feed port 16 may be opened in either upward or lateral direction. The upwardly opened powder feed port 16 is preferred because the metal salt can be supplied therethrough by gravity. In the case where it is difficult to supply the metal salt by gravity due to its low bulk density and high scattering property, it is preferred that such a metal salt is forced to be directly fed into the heating cylinder 11 of the extruder by using a transporting device (not shown) such as screws or coil-like screws.

The metal salt may be added through the powder feed port 16 to the recovered polyester which has been transported into the extruder 1 and passed through the first vent port 14a. Thus, the metal salt is directly added to the molten recovered polyester and, therefore, can be more intimately and more readily dispersed in the recovered polyester. The addition of the metal salt may be usually performed by using a weigh feeder or a volumetric feeder (not shown). In the case where the bulk density of the metal salt is varied depending upon its powder level in the feeder, the weigh feeder is preferably used. The metal salt may be added in the same amount as used in the first embodiment.

In the third preferred embodiment of the present invention, since the metal salt and the recovered polyester having a bulk density of 0.05 to 1.0 g.cm$^3$ are supplied through the powder feed port 16, it is possible to inhibit the molten metal salt from adhering to the powder feed port and peripheries thereof. The addition of the metal salt and the recovered polyester may also be usually performed by using a weigh feeder or a volumetric feeder (not shown). In the case where the bulk density of each of the metal salt and the recovered polyester supplied is varied depending upon its powder level in the feeder, the weigh feeder is preferably used. The bulk density of the recovered polyester supplied together with the metal salt is preferably 0.08 to 0.9 g/cm$^3$. When the bulk density of the recovered polyester is less than 0.05 g/cm$^3$, the amount of the recovered polyester transported is disadvantageously decreased. On the other hand, when the bulk density of the recovered polyester is more than 1.0 g/cm$^3$, the volume of the recovered polyester relative to that of the metal salt is reduced, so that it becomes difficult to transport the metal salt melted at a tip end of the transporting device, into the cylinder 11.

The metal salt and the recovered polyester may be added, through the powder feed port 16, to the recovered polyester which has been transported from the pulverizer 3 into the extruder 1 and then passed through the first vent port 14a. The recovered polyester fed through the powder feed port 16 together with the metal salt may have a specific resistance of not more than 1×10$^7$ Ω·cm upon melting, and may contain inorganic and/or organic particles or fine particles derived from catalyst residues generated upon the polymerization. The recovered polyester may be of either pellet-like or fluff-like shape. The amount of the recovered polyester supplied together with the metal salt based on the total amount of the recovered polyester supplied is not particularly restricted as long as stable supply of the metal salt into the heating cylinder 11 can be assured.

In the respective embodiments of the present invention, the decrement percentage in intrinsic viscosity (IV) of the recovered polyester is usually not more than 20%, preferably not more than 10%, more preferably not more than 8%. In the case where the decrement percentage in IV is too large, the obtained amorphous polyester sheet has a deteriorated strength and more frequently undergoes ruptures thereon when subjected to subsequent biaxial stretching process, so that the strength of the obtained film tends to be deteriorated. Especially, in the second and third preferred embodiments, by using the removal of water performed at a specific temperature in the pulverizer 3 and the deaeration at the region of the vent port 14a in combination, it is possible to effectively inhibit the decrease in IV due to hydrolysis of the polyester composition.

In the electrostatic pinning method, either wire electrode or blade electrode can be used. The D.C. voltage applied to the electrode is usually in the range of about 5 to about 10 kV. Incidentally, in the case where the electrostatic pinning method is applied to the present invention, water film may be formed on the surface of the rotary cooling drum.

The surface portion of the rotary cooling drum may be formed from metals or non-metals. From the standpoint of increase in electrostatic pinning force, the surface portion may be suitably formed of a conductive material. The temperature on the surface of the rotary cooling drum is usually 0 to 80° C., preferably 10 to 70° C., more preferably 15 to 60° C. When the temperature on the surface of the rotary cooling drum is less than 0° C., the adhesion between edge portions of the sheet and the rotary cooling drum is deteriorated, resulting in deterioration in flatness of the obtained sheet. On the other hand, when the temperature on the surface of the rotary cooling drum is more than 80° C., the adhesion between the sheet and the rotary cooling drum is excessively enhanced, so that it becomes difficult to separate the obtained sheet from the rotary cooling drum. The surface speed of the rotary cooling drum is not particularly restricted, and may be usually not less than 30 m/minute, preferably 40 m/minute.

As described above, in accordance with the present invention, since the metal salt can be added to polyester in an improved manner, the decrease in intrinsic viscosity of polyester is inhibited and the specific resistance thereof is reduced, there can be produced a polyester composition to which an electrostatic pinning method adopted for the shaping of an amorphous sheet can be suitably applied. Further, it is possible to add a specific amount of the metal salt to polyester having a high specific resistance upon melting, with a high accuracy.

EXAMPLES

The present invention will be described in more detail by examples, but these examples are not intended to limit the scope of the present invention. Incidentally, in the following Examples and Comparative Examples, "%" represents "% by weight".

(1) Specific Resistance Upon Melting 12 g of polyester was placed in a side-arm test tube. The test tube was immersed in an oil bath maintained at 285° C., to melt the polyester. After the polyester was completely melted, an interior of the test tube was exposed to reduced pressure and then replaced with a nitrogen gas. The exposure to reduced pressure and the replacement with nitrogen gas were repeatedly performed until air bubbles in polyester was completely removed. Next, stainless steel electrodes were immersed in the molten polyester and allowed to stand for 10 minutes. Immediately after a D.C. voltage of 3 kV was applied to the electrodes, the current value was measured. The specific resistance was calculated according to the following formula:

$$\rho v = (3{,}000/I) \times (S/L)\,(\Omega\cdot\text{cm})$$

(2) Intrinsic Viscosity (dl/g) of Polyester

One gram of polyester from which other polymer components and particles had been removed, was mixed and dissolved into 100 milliliters of a mixed solvent containing phenol and tetrachloroethane at weight ratio of 50:50. The intrinsic viscosity (IV) of the resultant polyester solution was measured at 30° C.

(3) Total Evaluation I (Examples 1 to 6 and Comparative Examples 1 to 4)

Evaluation ratings are as follows:

◎: Free from defects due to constrained air bubbles under the condition that the surface speed of rotary cooling drum is not less than 30 m/minute; and a good sheet quality, ○: Less than 10% of the decrement percentage in IV of melt-extruded polyester sheet relative to that before the melt-extrusion; free from defects due to constrained air bubbles under the condition that the surface speed of rotary cooling drum is less than 30 m/minute; and a good sheet quality, and ×: Not less than 10% of the decrement percentage in IV of melt-extruded polyester sheet relative to that before the melt-extrusion; defects due to constrained air bubbles therein; and no stable electrostatic pinning force.

(4) Total Evaluation II (Examples 7 to 17)

Evaluation ratings are as follows.

○: Less than 10% of the decrement percentage in IV of melt-extruded polyester sheet; and specific resistance of polyester composition upon melting can be reduced to not more than 50% of specific resistance before melt-extrusion, and ×: Not less than 10% of the decrement percentage in IV of melt-extruded polyester sheet; and specific resistance of polyester composition upon melting is less than 50% of specific resistance before melt-extrusion.

Example 1

In this Example, a vented twin screw extruder as shown in FIG. 1 was used.

Magnesium stearate was added to polyester having a specific resistance of $167 \times 10^7$ $\Omega\cdot$cm and an IV of 0.649 in such an amount that the concentration of magnesium atom in polyester was 45 ppm. The polyester composition was melted in the vented twin screw extruder having a cylinder inner diameter of 120 mm, successively transported through a gear pump and then extruded into a sheet from a slot die. The extruded sheet was electrostatically pinned onto the surface of a metallic rotary cooling drum using a wire electrode having a diameter of 0.04 mm to obtain a sheet having a thickness of 220 µm.

The conditions used were as follows: screw rotating speed of the twin screw extruder: 167 rpm; extrusion output: 1,000 kg/hour; voltage applied to the electrode: 5.0 kV; current flowing through the electrode: 1.2 mA; and surface speed of the rotary cooling drum: 20 m/minute.

The obtained sheet had a specific resistance of $1.7 \times 10^7$ $\Omega\cdot$cm upon melting and an IV of 0.629, was free from defects such as constrained air bubbles and was uniform in thickness. The results concerning specific resistance, IV and total evaluation of the obtained sheet are shown in Table 1.

Example 2

The same procedure as defined in Example 1 was conducted except that magnesium stearate was added in such an amount that the concentration of magnesium atom in polyester was 24 ppm, thereby producing an amorphous sheet. The obtained sheet had a specific resistance of $2.8 \times 10^7$ $\Omega\cdot$cm upon melting and an IV of 0.632, was free from defects such as constrained air bubbles and was uniform in thickness. The results concerning specific resistance, IV and total evaluation of the obtained sheet are shown in Table 1.

Example 3

The same procedure as defined in Example 1 was conducted except that magnesium stearate was added in such an amount that the concentration of magnesium atom in polyester was 120 ppm, thereby producing an amorphous sheet. When a voltage of 7.0 kV was applied to the electrode, the current flowing through the electrode was 2.6 mA. The obtained sheet had a specific resistance of $3.7 \times 10^7$ $\Omega\cdot$cm upon melting and an IV of 0.619, and showed the same good quality as that obtained in Example 1. The results concerning specific resistance, IV and total evaluation of the obtained sheet are shown in Table 1.

Examples 4 to 6

The same procedure as defined in Example 1 was conducted except that the surface speed of the rotary cooling drum was changed to 40 m/minute, 70 m/minute and 80 m/minute, respectively, thereby producing amorphous sheets. The obtained sheet showed the same good quality as that obtained in Example 1. The results concerning specific resistance, IV and total evaluation of the obtained sheets are shown in Table 1.

Comparative Example 1

The same procedure as defined in Example 1 was conducted except that no magnesium stearate was added, thereby producing an amorphous sheet. The obtained sheet had many crater-shaped defects due to constrained air bubbles and, therefore, were unsatisfactory in quality. The results concerning specific resistance, IV and total evaluation of the obtained sheet are shown in Table 1.

Comparative Example 2

The same procedure as defined in Example 1 was conducted except that no magnesium stearate was added and the surface speed of the rotary cooling drum was changed to 80 m/minute. Though trying to produce an amorphous sheet, the extruded sheet was unable to adhere onto the surface of the rotary cooling drum because of insufficient electrostatic pinning force, failing to obtain an amorphous sheet having a good quality. The results concerning specific resistance, IV and total evaluation of the obtained sheet are shown in Table 1.

Comparative Example 3

The same procedure as defined in Example 1 was conducted except that a non-vented single screw extruder having a cylinder inner diameter of 200 mm was used instead of the twin screw extruder, thereby producing an amorphous sheet. The obtained sheet had a specific resistance of 2.0×$10^7$ Ω·cm upon melting and an IV of 0.495 and, therefore, were practically unusable because of its large decrease in IV. The results concerning specific resistance, IV and total evaluation of the obtained sheet are shown in Table 1.

Comparative Example 4

The same procedure as defined in Example 1 was conducted except that magnesium stearate was added in such an amount that the concentration of magnesium atom in polyester was 2,000 ppm. Though trying to produce an amorphous sheet, the melt viscosity of the composition was considerably lowered, so that it was not possible to obtain an amorphous sheet in a stable manner. The results concerning specific resistance, IV and total evaluation of the obtained sheet are shown in Table 1.

TABLE 1

| Examples and Comparative Examples | Specific resistance after extrusion (×$10^7$ Ω · cm) | IV after extrusion (dl/g) | Rotating speed of Drum (m/min) | Total evaluation |
|---|---|---|---|---|
| Example 1 | 1.7 | 0.629 | 20 | ○ |
| Example 2 | 2.8 | 0.632 | 20 | ○ |
| Example 3 | 3.7 | 0.619 | 20 | ○ |
| Example 4 | 2.4 | 0.629 | 40 | ◉ |
| Example 5 | 5.7 | 0.629 | 70 | ◉ |
| Example 6 | 5.7 | 0.629 | 80 | ◉ |
| Comparative Example 1 | 100 | 0.629 | 20 | X |
| Comparative Example 2 | 100 | 0.629 | 70 | X |
| Comparative Example 3 | 2.0 | 0.495 | 20 | X |
| Comparative Example 4 | 1.9 | 0.400 | 20 | X |

Note:
Specific resistance before extrusion was 167 × $0^7$ Ω · cm. IV before extrusion was 0.649 dl/g.

Example 7

In this Example, the vented twin screw extruder as shown in FIG. 1 was also used.

Polyester having a specific resistance of 200×$10^7$ Ω·cm and an IV of 0.650 and magnesium stearate were fed into the vented twin screw extruder through a common feed opening 16 provided in a cylinder portion thereof such that the concentration of magnesium atom in polyester was 30 ppm. The mixture melt-extruded was introduced into water, quenched therein and shaped into a strand. The strand was then cut by a strand cutter to obtain pellets of the polyester composition.

The conditions used for the production of the polyester composition were as follows: cylinder inner diameter of the vented twin screw extruder: 120 mm; screw rotating speed: 167 rpm; extrusion output: 1,000 kg/hour; reduced pressure at vented portion: 1kPa; temperature at the feed opening 16: 40° C.; and temperature of adjacent heating cylinder: 270° C.

Magnesium stearate and polyester were independently fed in predetermined amounts by using a loss-in-weight-type feeder for the magnesium stearate (manufactured by K. TRON CO., LTD.) and a loss-in-weight-type feeder for the polyester (manufactured by ACCURATE CO., LTD.), respectively. Magnesium stearate was supplied by gravity together with the polyester pellets having a bulk density of 0.8 through the feed opening 16 from the height spaced above the feed opening 16 by 5 times (600 mm) the cylinder inner diameter D. The polyester composition was successively sampled from a tip end of the twin screw extruder, ten times every 3 minutes. The ten samples of the polyester composition were measured with respect to intrinsic viscosity (IV) and specific resistance (ρv). The results of the measurements concerning IV and ρv are shown in Table 2. As a result, it was determined that the decrease in IV was small while the decrease in ρv was large. Further, the deviation of ρv values was extremely small, and it was determined that the polyester composition had a stable quality. The results of evaluation for the obtained composition are shown in Table 2.

Example 8

Using a vented twin screw extruder having a cylinder diameter of 120 mm, the polyester composition obtained in Example 7 was successively melt-extruded into a sheet through a gear pump and then a slot die fitted thereto. The extruded sheet was electrostatically pinned onto the surface of a metallic rotary cooling drum whose temperature was maintained at 30° C., using a wire electrode having a diameter of 0.04 mm, thereby producing a sheet having a thickness of 230 μm.

Incidentally, the voltage applied to the wire electrode was 5.0 kV; the current flowing through the electrode was 1.2 mA; and the surface speed of the rotary cooling drum was 20 m/minute.

The polyester sheet was sampled every 3 minutes, and the obtained samples were measured with respect to IV and ρv. The results of the measurements concerning IV and ρv are shown in Table 2. As a result, it was determined that the decrease in IV was small while the decrease in ρv was large. Further, the polyester sheet was examined with respect to whether any constrained air bubbles existed, and the deviation of current values flowing through the wire electrode. As a result, it was determined that no defects due to constrained air bubbles existed, and the current flowing through the wire electrode was kept extremely stable. The results of evaluation for the obtained polyester sheet are shown in Table 2.

TABLE 2

| | Specific resistance (×$10^7$ Ω · cm) | | IV (dl/g) | | Deviation of | |
|---|---|---|---|---|---|---|
| Examples | Before extrusion | After extrusion (deviation) | Before extrusion | After extrusion | current value (mA) | Total evaluation |
| Example 7 | 200 | 4.0 (—) | 0.650 | 0.625 | — | ○ |
| Example 8 | 200 | 4.0 (±1) | 0.650 | 0.622 | 0.005 | ○ |

Example 9

In this Example, there was used a single screw extruder of the same type as shown in FIGS. 2 and 4 except that no vents were provided.

Polyester having a specific resistance of 105×$10^7$ Ω·cm and an IV of 0.610 and magnesium stearate were fed into the cylinder-shaped pulverizer 3 as shown in FIG. 2 such that the concentration of magnesium atom in polyester was 40 ppm.

The conditions of the pulverizer 3 were as follows: inner diameter of the pulverizer 3: 800 mm; temperature of polyester within the pulverizer 3: 130° C.; and rotating speed of a disc D with cutting blades: 1,100 rpm.

The polyester composition was transported from the pulverizer 3 to the single screw extruder 1 connected to the pulverizer 3. The polyester composition was melted in the single screw extruder 1, successively transported through a gear pump and then extruded from a strand die. The extruded strand 4 was introduced into a strand bath 5 maintained at 40° C., where the strand 4 was quenched and solidified. The solidified strand was then transported to a pelletizer 6 where the strand was cut into pellets.

The conditions of the single screw extruder 1 connected to the pulverizer 3 were as follows: inner diameter D of cylinder 11 of the single screw extruder 1: 80 mm; L/D: 36; and rotating speed of screw 12: 167 rpm.

The intrinsic viscosity (IV) and specific resistance of the obtained polyester composition are shown in Table 3. The decrement percentage in intrinsic viscosity of the polyester composition was as small as 3%. Further, the specific resistance of the polyester composition after extrusion was favorably reduced to $5 \times 10^7$ Ω·cm. The results of evaluation for the obtained polyester composition are also shown in Table 3.

Example 10

The same procedure as defined in Example 9 was conducted except that magnesium stearate was added in such an amount that the concentration of magnesium atom in polyester was 20 ppm, thereby producing a polyester composition. The results of evaluation for the obtained polyester composition are also shown in Table 3.

Example 11

The same procedure as defined in Example 9 was conducted except that magnesium decane-dicarboxylate was added in such an amount that the concentration of magnesium atom in polyester was 40 ppm, thereby producing a polyester composition. The results of evaluation of the obtained polyester composition are also shown in Table 3.

Example 12

The same procedure as defined in Example 9 was conducted except that a vented single screw extruder as shown in FIGS. 2 and 4 was used instead of the non-vented single screw extruder and the regions of vent ports 14a and 14b were maintained under a reduced pressure of 5 kPa, thereby producing a polyester composition. The results of evaluation of the obtained polyester composition are also shown in Table 3.

TABLE 3

| Examples | Temperature of pulverizer (° C.) | Concentration of Mg (ppm) | Specific resistance ($\times 10^7$ Ω · cm) | |
|---|---|---|---|---|
| | | | Before extrusion | After extrusion |
| Example 9 | 130 | 40 | 105 | 5 |
| Example 10 | 130 | 20 | 105 | 7 |
| Example 11 | 130 | 40 | 105 | 4 |
| Example 12 | 130 | 40 | 105 | 5 |

| Examples | IV (dl/g) | | |
|---|---|---|---|
| | Before extrusion | After extrusion | Total evaluation |
| Example 9 | 0.610 | 0.592 | ○ |
| Example 10 | 0.610 | 0.595 | ○ |
| Example 11 | 0.610 | 0.592 | ○ |
| Example 12 | 0.610 | 0.600 | ○ |

Example 13

In this Example, a vented single screw extruder as shown in FIGS. 3 and 4 was used.

Polyester having a specific resistance of $110 \times 10^7$ Ω·cm and an IV of 0.610 was fed into the cylinder-shaped pulverizer 3 as shown in FIG. 3.

The conditions of the pulverizer 3 were as follows: inner diameter of the pulverizer 3: 800 mm; temperature of polyester within the pulverizer 3: 130° C.; and rotating speed of a disc D with cutting blades: 1,100 rpm.

The polyester was transported from the pulverizer 3 to the vented single screw extruder 1 connected to the pulverizer 3. The polyester was melted in the vented single screw extruder 1, and then deaerated in the region of the first vent port 14a provided in the heating cylinder 11. Successively, magnesium stearate was added to the polyester through the powder feed port 16 in such an amount that the concentration of magnesium atom in polyester composition was 40 ppm. The polyester composition was further deaerated in the region of the second vent port 14b and then extruded from a strand die 2 fitted to a tip end of the extruder. The extruded strand 4 was introduced into a strand bath 5 maintained at 40° C., where the strand 4 was quenched and solidified. The solidified strand was then transported to a pelletizer 6 where the strand was cut into pellets.

The conditions of the vented single screw extruder 1 were as follows: inner diameter D of a cylinder 11 of the vented single screw extruder 1: 80 mm; L/D: 36; and reduced pressure used at respective regions of the first and second vent ports 14a and 14b: 5 kPa.

The intrinsic viscosity (IV) and specific resistance of the obtained polyester composition are shown in Table 4. The decrement percentage in intrinsic viscosity of the polyester composition was as small as 2%. Further, the specific resistance of the polyester composition after extrusion was favorably reduced to $5 \times 10^7$ Ω·cm. The results of evaluation of the obtained polyester composition are also shown in Table 4.

Example 14

The same procedure as defined in Example 13 was conducted except that magnesium stearate was added in such an amount that the concentration of magnesium atom in polyester was 250 ppm, thereby producing a polyester composition. The results of evaluations of the obtained polyester composition are also shown in Table 4.

Example 15

The same procedure as defined in Example 13 was conducted except that magnesium decane-dicarboxylate was added in such an amount that the concentration of magnesium atom in polyester was 50 ppm, thereby producing a polyester composition. The results of evaluations of the obtained polyester composition are also shown in Table 4.

TABLE 4

| Examples | Temperature of pulverizer (° C.) | Concentration of Mg (ppm) | Specific resistance (×10⁷ Ω · cm) Before extrusion | Specific resistance (×10⁷ Ω · cm) After extrusion |
|---|---|---|---|---|
| Example 13 | 130 | 40 | 110 | 5 |
| Example 14 | 130 | 250 | 110 | 0.7 |
| Example 15 | 130 | 50 | 110 | 4 |

| Examples | IV (dl/g) Before extrusion | IV (dl/g) After extrusion | Total evaluation |
|---|---|---|---|
| Example 13 | 0.610 | 0.598 | ○ |
| Example 14 | 0.610 | 0.583 | ○ |
| Example 15 | 0.610 | 0.600 | ○ |

Example 16

In this Example, a vented single screw extruder as shown in FIGS. 3 and 4 was used.

Polyester having a specific resistance of 110×10⁷ Ω·cm and an IV of 0.610 was fed into the cylinder-shaped pulverizer 3 as shown in FIG. 3.

The conditions of the pulverizer 3 were as follows: inner diameter of the pulverizer 3: 800 mm; temperature of polyester within the pulverizer 3: 190° C.; and rotating speed of a disc D with cutting blades: 1,100 rpm.

The polyester was transported from the pulverizer 3 to the vented single screw extruder 1 connected to the pulverizer 3. The polyester was melted in the vented single screw extruder 1, and then deaerated in the region of the first vent port 14a provided in the heating cylinder 11. Successively, magnesium stearate and polyester having a bulk density of 0.7, a specific resistance of 110×10⁷ Ω·cm and an IV of 0.610 were added to the polyester through the powder feed port 16 in such an amount that the concentration of magnesium atom in polyester composition was 40 ppm. The polyester composition was further deaerated in the region of the vent port 14b and then extruded from a strand die 2 fitted to a tip end of the extruder 1. The extruded strand 4 was introduced into a strand bath 5 maintained at 40° C., where the strand 4 was quenched and solidified. The solidified strand 4 was then transported to a pelletizer 6 where the strand 4 was cut into pellets.

The conditions of the vented single screw extruder 1 were as follows: inner diameter D of the vented single screw extruder 1: 80 mm; L/D: 36; and reduced pressure used at respective regions of the first and second vent ports 14a and 14b: 5 kPa.

The intrinsic viscosity (IV) and specific resistance of the obtained polyester composition are shown in Table 5. The decrement percentage in intrinsic viscosity of the polyester composition was as small as 2.5%. Further, the specific resistance of the polyester composition after extrusion was favorably reduced to 5×10⁷ Ω·cm. The results of evaluations of the obtained polyester composition are also shown in Table 5.

Example 17

The same procedure as defined in Example 16 was conducted except that magnesium stearate was added in such an amount that the concentration of magnesium atom in polyester was 200 ppm, thereby producing a polyester composition. The results of evaluations of the obtained polyester composition are also shown in Table 5.

TABLE 5

| Examples | Temperature of pulverizer (° C.) | Concentration of Mg (ppm) | Specific resistance (×10⁷ Ω · cm) Before extrusion | Specific resistance (×10⁷ Ω · cm) After extrusion |
|---|---|---|---|---|
| Example 16 | 190 | 40 | 110 | 5.0 |
| Example 17 | 190 | 200 | 110 | 1.0 |

| Examples | IV (dl/g) Before extrusion | IV (dl/g) After extrusion | Total evaluation |
|---|---|---|---|
| Example 16 | 0.610 | 0.595 | ○ |
| Example 17 | 0.610 | 0.583 | ○ |

What is claimed is:

1. A process for producing a polyester composition comprising polyester and a metal salt of aliphatic carboxylic acid, said process comprising:

providing a regenerating apparatus comprising a pulverizer and a vented single screw extruder connected to said pulverizer;

feeding recovered polyester having a specific resistance of not less than 1×10⁷ Ω·cm upon melting, to said pulverizer;

pulverizing said recovered polyester in said pulverizer; and adding said metal salt to said pulverized recovered polyester in such an amount that the concentration of metal atom based on said polyester composition is 0.5 to 1,000 ppm, before said pulverized recovered polyester reaches said vented single screw extruder.

2. A process according to claim 1, wherein said polyester within said pulverizer is maintained at a temperature of not less than 90° C.

3. A process according to claim 1, wherein said metal salt is a magnesium salt.

4. A process according to claim 3, wherein said metal salt is magnesium decane-dicarboxylate or magnesium stearate.

5. A process according to claim 1, wherein the decrement percentage in intrinsic viscosity of said polyester composition after melt-extrusion relative to that before melt-extrusion is not more than 10%.

6. A process for producing a polyester sheet, wherein said polyester composition produced according to claim 1 is brought into close contact with a surface of a rotary cooling drum which is rotated at a surface speed of not less than 30 m/minutes by an electrostatic pinning method.

7. A process for producing a polyester composition comprising polyester and a metal salt of aliphatic carboxylic acid, said process comprising:

providing a regenerating apparatus comprising a pulverizer and a single screw extruder connected to said pulverizer, said single screw extruder having a vent port and a powder feed port sequentially arranged along the extruding direction thereof;

feeding recovered polyester having a specific resistance of not less than 1×10⁷ Ω·cm upon melting, to said pulverizer;

pulverizing said recovered polyester in said pulverizer; and feeding said metal salt through said powder feed port into said single screw extruder to add said metal salt to said pulverized recovered polyester in such an amount that the concentration of metal atom based on said polyester composition is 0.5 to 1,000 ppm.

8. A process according to claim 7, wherein said polyester within said pulverizer is maintained at a temperature of not less than 90° C.

9. A process according to claim 7, wherein said metal salt is a magnesium salt.

10. A process according to claim 9, wherein said metal salt is magnesium decane-dicarboxylate or magnesium stearate.

11. A process according to claim 7, wherein the decrement percentage in intrinsic viscosity of said polyester composition after melt-extrusion relative to that before melt-extrusion is not more than 10%.

12. A process for producing a polyester sheet, wherein said polyester composition produced according to claim 7 is brought into close contact with a surface of a rotary cooling drum which is rotated at a surface speed of not less than 30 m/minutes by an electrostatic pinning method.

13. A process for producing a polyester composition comprising polyester and a metal salt of aliphatic carboxylic acid, said process comprising:

providing a regenerating apparatus comprising a pulverizer and a single screw extruder connected to said pulverizer, said single screw extruder having a vent port and a powder feed port sequentially arranged along the extruding direction thereof;

feeding recovered polyester having a specific resistance of not less than $1\times10^7$ Ω·cm upon melting, to said pulverizer;

pulverizing said recovered polyester in said pulverizer; and feeding said metal salt and polyester having a bulk density of 0.05 to 1.0 g/cm³ through said powder feed port into said single screw extruder to add said metal salt and said polyester to said pulverized recovered polyester.

14. A process according to claim 13, wherein said single screw extruder has a first vent port, a powder feed port and a second vent port sequentially arranged along the extruding direction thereof.

* * * * *

UNITED STATES PATENT AND TRADEMARK OFFICE
CERTIFICATE OF CORRECTION

PATENT NO.   : 6,361,734 B1
DATED        : March 26, 2002
INVENTOR(S)  : Takatoshi Miki It is certified that error appears in the above-identified patent and that said Letters Patent is hereby corrected as shown below:

<u>Title page,</u>
Please add the following Priority Information:

-- [30] Related Foreign Priority Applications
Japan. 9-120167 April 23, 1997
Japan. 9-151616 May 26, 1997
Japan. 9-151617 May 26, 1997
Japan. 9-151618 May 26, 1997
Japan. 9-154585 May 28, 1997 --

Signed and Sealed this

Seventeenth Day of September, 2002

*Attest:*

JAMES E. ROGAN
*Attesting Officer*   *Director of the United States Patent and Trademark Office*